United States Patent

Rines et al.

Patent Number: 5,198,558
Date of Patent: Mar. 30, 1993

[54] PROCESS FOR THE PREPARATION OF TRIPHENYLMETHANE DYES

[75] Inventors: Steven P. Rines, Guilderland; Charles J. Zullig, Schenectady, both of N.Y.

[73] Assignee: BASF Corporation, Parsippany, N.J.

[21] Appl. No.: 629,521

[22] Filed: Dec. 18, 1990

[51] Int. Cl.$^5$ .......................................... C07C 221/00
[52] U.S. Cl. .................................... 552/108; 552/114
[58] Field of Search ........................ 552/108, 113, 114

[56] References Cited

U.S. PATENT DOCUMENTS

| | | | |
|---|---|---|---|
| 3,927,044 | 12/1975 | Foster et al. | 552/109 |
| 4,566,999 | 1/1986 | Engelmann | 552/108 |
| 5,013,857 | 5/1991 | Berneth et al. | 552/114 |

Primary Examiner—C. Warren Ivy
Assistant Examiner—Raymond Covington

[57] ABSTRACT

A process for the preparation of triphenylmethane dye of the formula

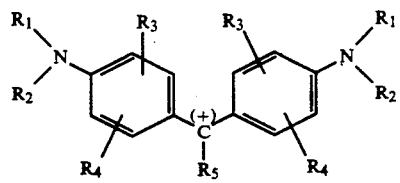

wherein
$R_1$ and $R_2$ each denote hydrogen, $C_1$–$C_4$ alkyl, benzyl or sulfobenzyl,
$R_3$ and $R_4$ each denote hydrogen, $C_1$–$C_4$ alkyl or sulfonic acid
$R_5$ denotes a phenyl, sulfophenyl, dialkylaminophenyl, $C_1$–$C_4$ alkylphenyl, $C_1$–$C_4$ alkyl-dialkylaminophenyl, halogenophenyl, naphthyl, sulfonaphthyl, disulfonaphthyl, or alkyldisulfonaphthyl by oxidation of the leuco compound of the corresponding triphenylmethane dye with manganese dioxide in the presence of an aqueous phosphoric acid at a temperature of about 20° C. to about 100° C.,
by the addition of a base selected from the group consisting of ammonia, amines, aminoalcohols, metal hydroxides of Groups IA, IIA, IIIA and mixtures thereof in an amount sufficient to neutralize the aqueous solution,
by filtration from the precipitate and
by isolation of the triphenylmethane dye.

32 Claims, No Drawings

PROCESS FOR THE PREPARATION OF TRIPHENYLMETHANE DYES

FIELD OF THE INVENTION

The present invention relates to a process for the preparation of triphenylmethane dyes, more particularly, it relates to a process of preparing such dyes with a very low content of heavy metal residues.

BACKGROUND OF THE INVENTION

Triphyenylmethane dyes are known and it has been established that transition metal oxides like dichromate or manganese dioxide will convert the corresponding leuco compound to the triphenylmethane dye. However, large amounts of transition metal salts are produced in the dyes. The dyes have to be salted out of the aqueous solution with ammonium, alkali metal or alkaline earth metal chlorids or sulfates. The resulting dyes contained therefore more or less amounts of salts.

The U.S. Pat. No. 4,566,999 discloses a process for the preparation of acid dyestuffs of low electrolyte content by the oxidation of the leuco compound with manganese dioxide in the presence of phosphoric acid and ammonia.

An object of the present invention is to provide a process for the preparation of triphenylmethane dyes, which are substantially free of heavy metal residues.

SUMMARY OF THE INVENTION

The present invention provides a process for the preparation of triphenylmethane dyes of the formula:

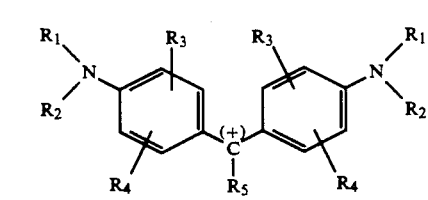

wherein
  $R_1$ and $R_2$ each denote hydrogen, $C_1$-$C_4$ alkyl, benzyl or sulfobenzyl,
  $R_3$ and $R_4$ each denote hydrogen, $C_1$-$C_4$ alkyl or sulfonic acid
  $R_5$ denotes a phenyl, sulfophenyl, dialkylaminophenyl, $C_1$-$C_4$ alkylphenyl, $C_1$-$C_4$ alkyl-dialkylaminophenyl, halogenophenyl, naphthyl, sulfonaphthyl, disulfonaphthyl, or alkyldisulfonaphthyl
comprising
  I. oxidation of the leuco compound of the corresponding triphenylmethane dye with manganese dioxide in the presence of aqueous phosphoric acid at a temperature of about 20° C. to about 100° C.
  II. adding a base selected from the group consisting of ammonia, amines, aminoalcohols, metal hydroxides of Groups IA, IIA, IIIA and mixtures thereof in an amount sufficient to neutralize the aqueous solution,
  III. filtration from the precipitate and
  IV. isolation of the triphenylmethane dye.

DETAILED DESCRIPTION OF THE INVENTION

The triphenylmethane dyes of the present invention have the general formula

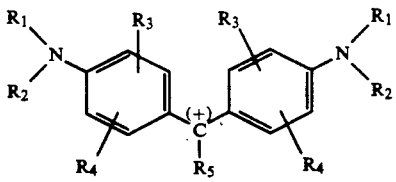

wherein
  $R_1$ and $R_2$ each denote hydrogen, $C_1$-$C_4$ alkyl, benzyl or sulfobenzyl,
  $R_3$ and $R_4$ each denote hydrogen, $C_1$-$C_4$ alkyl or sulfonic acid
  $R_5$ denotes a phenyl, sulfophenyl, dialkylaminophenyl, $C_1$-$C_4$ alkylphenyl, $C_1$-$C_4$ alkyl-dialkylaminophenyl, halogenophenyl, maphthyl, sulfonaphthyl, disulfonaphthyl, or alkyldisulfonaphthyl
comprising
  I. oxidation of the leuco compound of the corresponding triphenylmethane dye with manganese dioxide in the presence of aqueous phosphoric acid at a temperature of about 20° C. to about 100° C.,
  II. adding a base selected from the group consisting of ammonia, amines, aminoalcohols, metal hydroxides of Groups IA, IIA, IIIA and mixtures thereof in an amount sufficient to neutralize the aqueous solution,
  III. filtration from the precipitate and
  IV. isolation of the triphenylmethane dye.

Suitable examples are 4',4" bis [N-ethyl-N-sulfobenzylamino]-triphenylmethane-2-sulfonate, 4',4" bis [diethylamino]-triphenylmethane-2,4-disulfonic acid, 4',4" bis [N-ethyl-N-benzylamino]-triphenylmethane-2,4-disulfonic acid, 4',4" bis [N-ethyl-N-sulfobenzylamino]-triphenylmethane-2- methyl-4-dimethylamine and 4,4',4" tris [dimethylamino]-triphenylmethane.

Preferred are 4',4" bis [N-ethyl-N-sulfobenzylamino]-triphenylmethane-2-sulfonate, 4,4',4" tris [dimethylamino]-triphenylmethane and 4',4" bis [N-ethyl-N-sulfobenzylamino]-triphenylmethane-2-methyl-4-dimethylamine.

The oxidation step I is conducted in water with manganese dioxide in the presence of phosphoric acid. The leuco compound may be formed in situ in aqueous solution, or added to the water. Phosphoric acid and manganese dioxide is added to the slurry of the leuco compound in water. The molar ratio of manganese dioxide to leuco compound is from about 1.0 to 1.5, preferably 1.0 to 1.3 mol manganese dioxide per mol leuco compound.

Most important for a complete precipitation in the following step II is the molar ratio of phosphoric acid to manganese dioxide. This molar ratio is from about 1.0 to 1.5, preferably 1.0 to 1.15 mol phosphoric acid per mol manganese dioxide, calculated from the pure reagents. The purity of manganese dioxide is determined by atomic absorption.

In a variation of this process phosphoric acid could be replaced partly or completely by another organic or inorganic acid in an amount sufficient that the pH is from about 0.9 to about 3.0. All known organic and inorganic acids can be used if they are water soluble. Suitable organic or inorganic acids in addition to phosphoric acid are for example sulfuric acid, hydrochloric acid, oxalic acid, p-toluenesulfonic acid and the like.

Important for this process variation is, that in step II a salt of phosphoric acid is needed for a complete precipitation of manganeous ions.

The oxidation is exothermic and the temperature is maintained at from about 20° to about 100° C. for a time period of 2 to 12 hours.

After the oxidation step I, the reaction mixture is kept at a temperature in the range of from about 65° to about 85° C. The pH of the reaction mixture is from about 0.9 to about 3.0. A base is added in an amount effective to neutralize the aqueous solution, which means to reach a pH of the solution of about 7 to 8.

The base is selected from the group consisting of ammonia, amines, aminoalcohols, metal hydroxides of Groups IA, IIA, IIIA and mixtures thereof.

Suitable amines are $C_1$ to $C_{20}$ amines, including trimethylamine, triethylamine, butylamine, piperidine, hexylamine, dodecylamine and the like. Suitable aminoalcohols are $C_2$ to $C_{20}$ aminoalcohols, including ethanolamine, diethanolamine, triethanolamine and the like. Preferred are trimethylamine, triethylamine and ethanolamine.

Suitable metal hydroxides are sodium hydroxide, potassium hydroxide, lithium hydroxide, calcium hydroxide and aluminum hydroxide. Preferred metal hydroxides are sodium hydroxide and potassium hydroxide.

The bases may be used singly, as a mixture, at once or stepwise. The pH of the reaction mixture after the oxidation step is from about 0.9 to about 3.0. For example, by a first addition of sodium hydroxide the pH is rised to about 2 to 3. Then ammonia is added until a pH of 4 to 5 is reached. At this point, precipitation occurs. Finally, the pH is rised until a pH of 7 to 8 is reached.

The equivalent ratio of the base to the phosphoric acid is from about 1.0 to about 5.0, preferably 1.0 to about 2.0 equivalents base per equivalent phosphoric acid.

The precipitate is an insoluble solid of the formula $Mn_a(X)_b(PO_4)_c$, where x is hydrogen, a metal cation of Groups IA, IIA, IIIA, a protonated ammonia or protonated amine or mixtures thereof and
a = 1, 2 or 3;
b = 1 or 2;
c = 1, 2 or 3.

Examples of precipitates are $MnNH_4PO_4$m $MnNaPO_4$, $MnKPO_4$, $Mn(HOC_2H_4NH_3)PO_4$, $MnHPO_4$ or mixtures thereof.

In the variation of the process, mentioned in step I, a salt of phosphoric acid is added in step II.

All water soluble salts of phosphoric acid can be used. Suitable salts have the formula $(X)_b(PO_4)_c$ where X is hydrogen, a metal cation of Groups IA, IIA or IIIA, a protonated ammonia or protonated amine or mixtures thereof and
b = 1, 2 or 3;
c = 1 or 2.

Examples of salts are ammoniumdihydrogenphosphate, ammoniumhydrogenphosphate, ammoniumphosphate, sodiumphosphate, potassiumphosphate, sodiumdihydrogenphosphate, sodiumhydrogenphosphate or mixtures thereof.

If only a part of phosphoric acid is replaced by another acid in step I the molar ratio of the sum of phosphoric acid, used in step I, and the salt of phosphoric acid, used in step II is from about 1.0 to 1.5, preferably 1.0 to 1.15 mol per mol manganese dioxide.

If no phosphoric acid is used in step I, the molar ratio of the salt of the phosphoric acid, used in step II is from about 1.0 to 1.5, preferably 1.0 to 1.15 mol per mol manganese dioxide.

The salt of the phosphoric acid can be added in step II before, during, after or together with the addition of the base. Preferred is the addition of the salt before the addition of the base.

The addition of the base is basically the same as it is described in the principal process for step II and is in an amount sufficient to reach a pH of 7 to 8. In addition to the precipitation in step II of the principal process it is possible to precipitate salts of the inorganic or organic acid. For example if sulfuric acid is used in step I, bariumsulfate can be precipitated by adding variumchloride to the solution.

The precipitate is filtered from the aqueous solution of the dye and washed several times with water in step III.

The resulting aqueous solution of the triphenylmethane dye contains no more than 5 ppm, preferably less than 3 ppm manganeous ions. In step IV, the dye can also be isolated from the solution by evaporation of the water in a known manner. The dry triphenylmethane dye contains from about 5 to 15 ppm, preferably about 5 to 10 ppm manganeous ions.

EXAMPLE 1

In a 250 ml. three-necked, round-bottomed flask, equipped with condenser, overhead mechanical stirrer, and thermowatch system, was placed 28.5 g ethyl-(3-sulfobenzyl) aniline (92.2 mmoles) and 10.0 g 2-sulfobenzaldehyde (46.1 mmoles) and washed in with 69 ml of water. The slurry was heated to 102° C. for 40 hours, and then cooled to 45° C. 14.9 g phosphoric acid (135.0 mmoles) was added followed by 12.0 g manganese dioxide (135.0 mmoles). The reaction was exothermic and the temperature rose to 68° C. The reaction mixture was then heated to 70° C. for 3 hours. The mixture was then transferred into a 400 ml beaker and stirred at 50° C. while 18,35 g aqueous ammonia (29.4% by weight, 138.0 mmoles) was added. During this period the pH rose from 3.50 to 8.46. The solution was stirred only 15 minutes before clarification. The solution was filtered and the filtercake was washed three times with 10.0 g of water to yield 174.5 g of aqueous solution of 4',4'' bis [N-ethyl-N-sulfobenzylamino]-triphenylmethane-2-sulfonate and 15.1 g of salts. The manganese concentration in the solution was 1.0 ppm.

EXAMPLE 2

In a 1000 ml round bottom flask, equipped as in Example 1, was placed 99.83 g 2-sulfobenzaldehyde (450.4 mmoles), 332.3 g ethyl-(3-sulfobenzyl) aniline (900.8 mmoles) and 255 g water.

The mixture was heated to 102° to 105° C. for 40 hours. 64.61 g phosphoric acid (560.5 mmoles) was added after cooling the reaction mixture to 50° C. This was followed by 55.35 g manganese dioxide (572.0 mmoles). The temperature rose due to the exothermic reaction to 74° C. and was held for 4 hours at 70° to 75° C. Finally with the reaction pH at 1.80, 38.1 g 10 molar sodium hydroxide solution (285.1 mmoles) was added to attain a pH of 2.65; this was followed with 22.0 g 29.4% by weight of aqueous ammonia (379.8 mmoles) to precipitate the manganous ions and give a pH of 4.45. Finally the pH was raised to 7.15 with 7.8 g 10 molar sodium hydroxide solution (58.4 mmoles). The solution was filtered and the filtercake was washed 4 times with 50 ml of water. Received was 867.53 g of aqueous dye containing 3 ppm of manganese. After removing the water 373.3 g 4',4" bis [N-ethyl-N-sulfobenzylamino]-triphenylmethane-2-sulfonate was obtained with 8 ppm manganese content.

We claim:

1. A process for the preparation of triphenylmethane dyes of the formula:

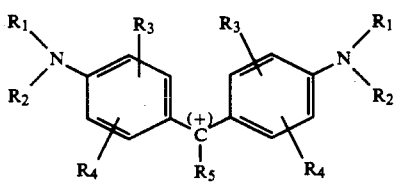

wherein
$R_1$ and $R_2$ each denote hydrogen, $C_1$-$C_4$ alkyl, benzyl or sulfobenzyl,
$R_3$ and $R_4$ each denote hydrogen, $C_1$-$C_4$ alkyl or sulfonic acid
$R_5$ denotes a phenyl, sulfophenyl, dialkylaminophenyl, $C_1$-$C_4$ alkylphenyl, $C_1$-$C_4$ alkyl-dialkylaminophenyl, halogenophenyl, naphthyl, sulfonaphthyl, disulfonaphthyl, or alkyldisulfonaphthyl comprising
I. oxidation of the leuco compound of the corresponding triphenylmethane dye with manganese dioxide in the presence of aqueous phosphoric acid at a temperature of about 20° C. to about 100° C.,
II. adding a base selected from the group consisting of ammonia, amines, aminoalcohols, metal hydroxides of Groups IA, IIA, IIIA and mixtures thereof in an amount sufficient to neutralize the aqueous solution,
III. filtration from the precipitate and
IV. isolation of said triphenylmethane dye.

2. A process according to claim 1, wherein said triphenylmethane dyes are 4',4" bis [N-ethyl-N-sulfobenzylamino]-triphenylmethane-2-sulfonate, 4',4" bis [N-ethyl-N-sulfobenzylamino]-triphenylmethane-2-methyl-4-dimethylamine.

3. A process according to claim 1, wherein at least one mol phosphoric acid is used per mol manganese dioxide in the oxidation step I.

4. A process according to claim 1, wherein said base is ammonia.

5. A process according to claim 1, wherein said base is an organic amine with 1 to 20 carbon atoms.

6. A process according to claim 1, wherein said base is an aminoalcohol with 2 to 20 carbon atoms.

7. A process according to claim 1, wherein said base is trimethylmaine, triethylamine or ethanolamine.

8. A process according to claim 1, wherein said metal hydroxide is sodium hydroxide, potassium hydroxide, lithium hydroxide or aluminum hydroxide.

9. A process according to claim 1, wherein said base is a mixture of ammonia and sodium hydroxide.

10. A process according to claim 1, wherein said base is added stepwise.

11. A process according to claim 1, wherein in step II at least two different bases are added stepwise and separately.

12. A process according to claim 1, wherein in step II a metal hydroxide of Groups IA, IIA or IIIA is added until a pH of 2.0 to 3.0 is reached, then ammonia is added until a pH of 4.0 to 5.0 is reached followed by adding said metal hydroxide until a pH of 7.0 to 8.0 is reached.

13. A process according to claim 12, wherein said metal hydroxide is sodium hydroxide or potassium hydroxide.

14. A process according to claim 1, wherein said precipitate is a solid of the formula $Mn_a(X)_b(PO_4)_c$ where X is hydrogen, a metal cation of Groups IA, IIA or IIIA, a protonated ammonia or protonated amine or mixtures thereof and
a = 1, 2 or 3;
b = 1 or 2;
c = 1, 2 or 3.

15. A process for the preparation of triphenylmethane dyes of the formula:

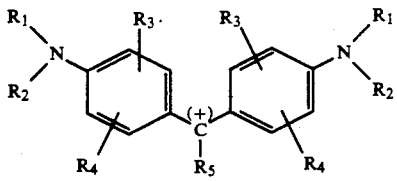

wherein
$R_1$ and $R_2$ each denote hydrogen $C_1$-$C_4$ alkyl, benzyl or sulfobenzyl,
$R_3$ and $R_4$ each denote hydrogen, $C_1$-$C_4$ alkyl or sulfonic acid
$R_5$ denotes a phenyl, sulfophenyl, dialkylaminophenyl, $C_1$-$C_4$ alkylphenyl, $C_1$-$C_4$ alkyl-dialkylaminophenyl, halogenophenyl, naphthyl, sulfonaphthyl, disulfonaphthyl, or alkyldisulfonaphthyl comprising
I. oxidation of the leuco compound of the corresponding triphenylmethane dye with manganese dioxide in the presence of an aqueous organic or inorganic acid in an amount sufficient that the pH is from about 0.9 to about 3.0 at a temperature of about 20° C. to about 100° C.,
II. adding a salt of phosphoric acid and a base selected from the group consisting of ammonia, amines, aminoalcohols, metal hydroxides of Groups IA, IIA, IIIA and mixtures thereof in an amount sufficient to neutralize the aqueous solution,
III. filtration from the precipitate and
IV. isolation of said triphenylmethane dye.

16. A process according to claim 15, wherein said triphenylmethane dyes are 4',4" bis [N-ethyl-N-sulfobenzylamino]-triphenylmethane-2-sulfonate, 4',4" bis [N-ethyl-N-sulfobenzylamino]-triphenylmethane-2-methyl-4-dimethylamine.

17. A process according to claim 15, wherein said organic or inorganic acid is selected from the group consisting of phosphoric acid, sulfuric acid, hydrochloric acid, oxalic acid, p-toluenesulfonic acid or mixtures thereof.

18. A process according to claim 15, wherein said salt of phosphoric acid is a salt of the formula $(X)_b(PO_4)_c$ where X is hydrogen, a metal cation of Groups IA, IIA or IIIA, a protonated ammonia or protonated amine or mixtures thereof and
b=1, 2 or 3;
c=1 or 2.

19. A process according to claim 15, wherein said salt is selected from the group consisting of ammoniumdihydrogenphosphate, ammoniumhydrogenphosphate, ammoniumphosphate, sodium phosphate, potassium phosphate, sodiumdihydrogenphosphate, sodiumhydrogenphosphate or mixtures thereof.

20. A process according to claim 15, wherein at least one mol of the salt of phosphoric acid or if the inorganic acid is completely or partly phosphoric acid one mol of the sum of phosphoric acid and the salt of phosphoric acid is used per mol manganese dioxide.

21. A process according to claim 15, wherein said base is ammonia.

22. A process according to claim 15, wherein said base is an organic amine with 1 to 20 carbon atoms.

23. A process according to claim 15, wherein said base is an aminoalcohol with 2 to 20 carbon atoms.

24. A process according to claim 15, wherein said base is trimethylamine, triethylamine or ethanolamine.

25. A process according to claim 15, wherein said metal hydroxide is sodium hydroxide, potassium hydroxide, lithium hydroxide or aluminum hydroxide.

26. A process according to claim 15, wherein said base is a mixture of ammonia and sodium hydroxide.

27. A process according to claim 15, wherein said salt is added before said base.

28. A process according to claim 15, wherein said base is added stepwise.

29. A process according to claim 15, wherein in step II at least two different bases are added stepwise and separately.

30. A process according to claim 15, wherein in step II said salt and a metal hydroxide of Groups IA, IIA or IIIA is added until a pH of 2.0 to 3.0 is reached, then ammonia is added until a pH of 4.0 to 5.0 is reached followed by adding said metal hydroxide until a pH of 7.0 to 8.0 is reached.

31. A process according to claim 15, wherein said metal hydroxide is sodium hydroxide or potassium hydroxide.

32. A process according to claim 15, wherein said precipitate is a solid of the formula $Mn_a(X)_b(PO_4)_c$ where X is hydrogen, a metal cation of Groups IA, IIA or IIIA, a protonated ammonia or protonated amine or mixtures thereof and
a=1, 2 or 3;
b=1 or 2;
c=1, 2 or 3.

* * * * *